Aug. 3, 1971   T. C. JONES   3,597,185
SCOOP HOLDER FOR GLASSWARE FORMING MACHINE
Filed Feb. 19, 1968   2 Sheets-Sheet 1

INVENTOR.
THOMAS C. JONES
BY
McCormick, Paulding & Huber
ATTORNEYS

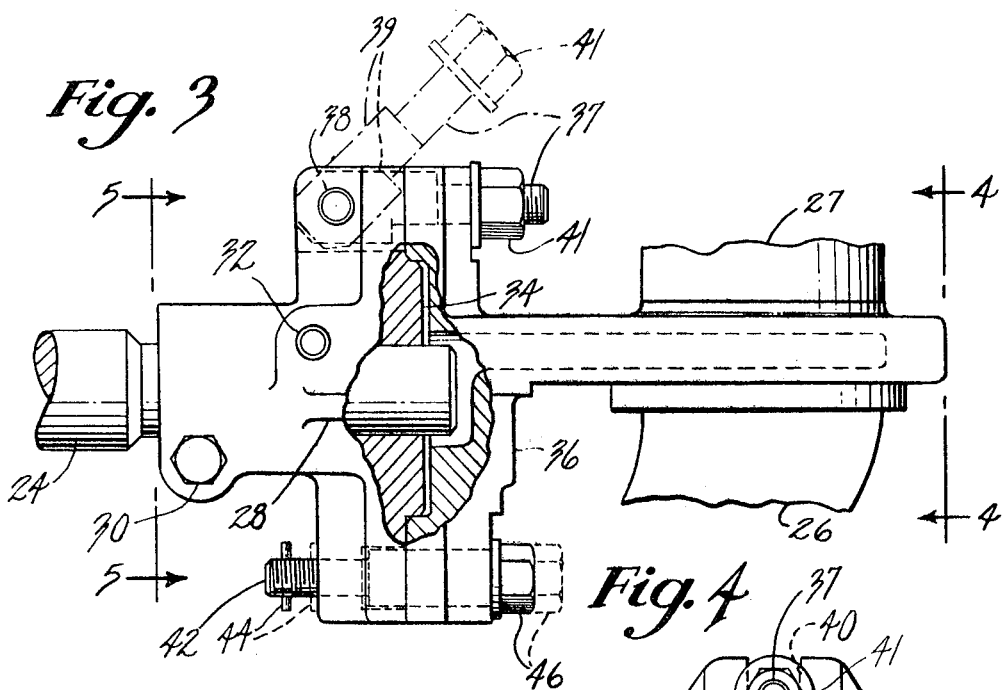
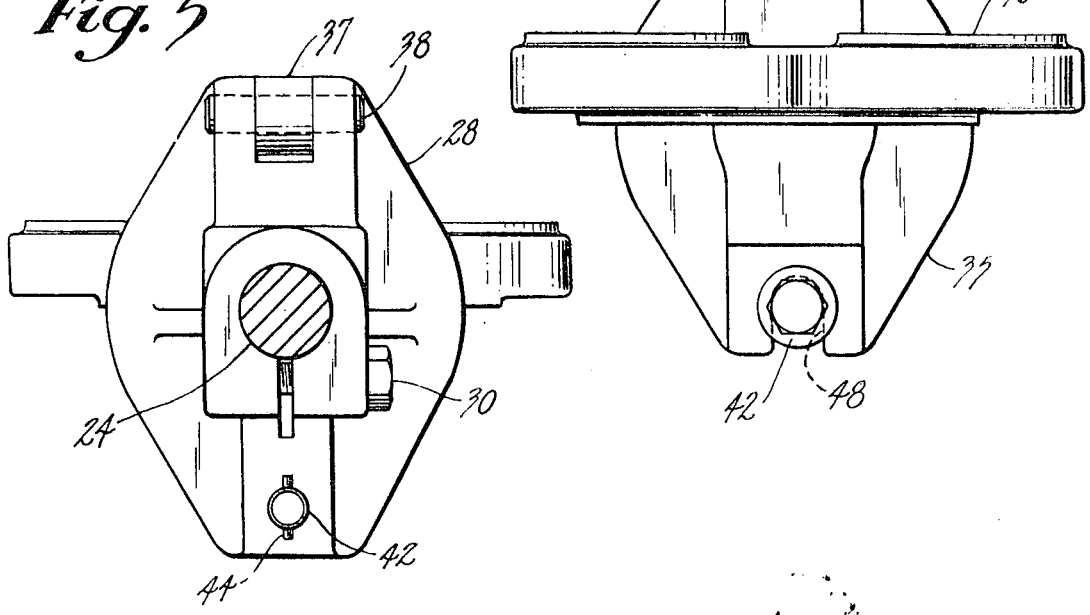

3,597,185
SCOOP HOLDER FOR GLASSWARE
FORMING MACHINE
Thomas C. Jones, Hartford, Conn., assignor to Emhart
Corporation, Bloomfield, Conn.
Filed Feb. 19, 1968, Ser. No. 706,394
Int. Cl. C03b 5/34
U.S. Cl. 65—172                    2 Claims

ABSTRACT OF THE DISCLOSURE

A retractable scoop for each individual section of a glassware forming machine is removably mounted on a flanged fitting at the end of a reciprocable piston rod. The fitting has a swing bolt and threaded screw or stud, both of which are received in slots in a scoop holder which carries the scoop itself. The swing bolt carries a nut and the screw can be threaded into the fitting so that both cooperate to releasably clamp the scoop holder to the piston rod.

SUMMARY OF THE INVENTION

This invention relates to quick release scoop holders for glassware forming machines, and deals more particularly with a scoop holder which is releasably clamped to a fitting carried by the movable portion of the scoop operating mechanism.

An object of the present invention is to provide a quick release scoop holder for a glassware forming machine, which mechanism is so designed as to reduce or eliminate the downtime of the machine heretofore required when a scoop becomes worn and must be removed for replacement of repair.

The drawings show a preferred embodiment of the invention and such embodiment will be described, but it will be understod that various changes may be made from the construction disclosed, and that the drawings and description are not to be construed as defining or limiting the scope of the invention, the claims forming a part of this specification being relied upon for that purpose.

BRIEF DESCRIPTION OF DRAWINGS

FIG. 3 is a side elevational view of the scoop holder shown in FIG. 2 with a swing bolt in its active and inactive positions in solid and broken lines respectively.

FIG. 4 is an end view taken along the line 4—4 of FIG. 3.

FIG. 5 is a sectional view taken on the line 5—5 of FIG. 3.

DETAILED DESCRIPTION

Figure 1:
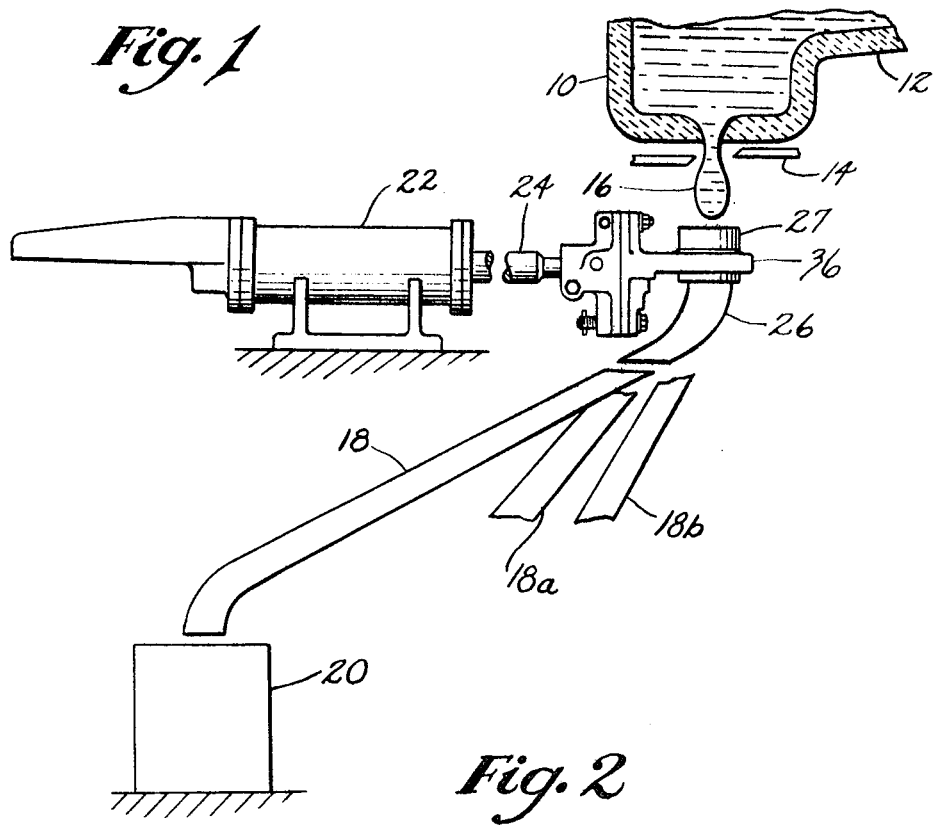
FIG. 1 is a somewhat schematic view of a portion of a glassware forming machine, including scoop mechanism having a quick release scoop holder constructed in accordance with the present invention.
Figure 2:
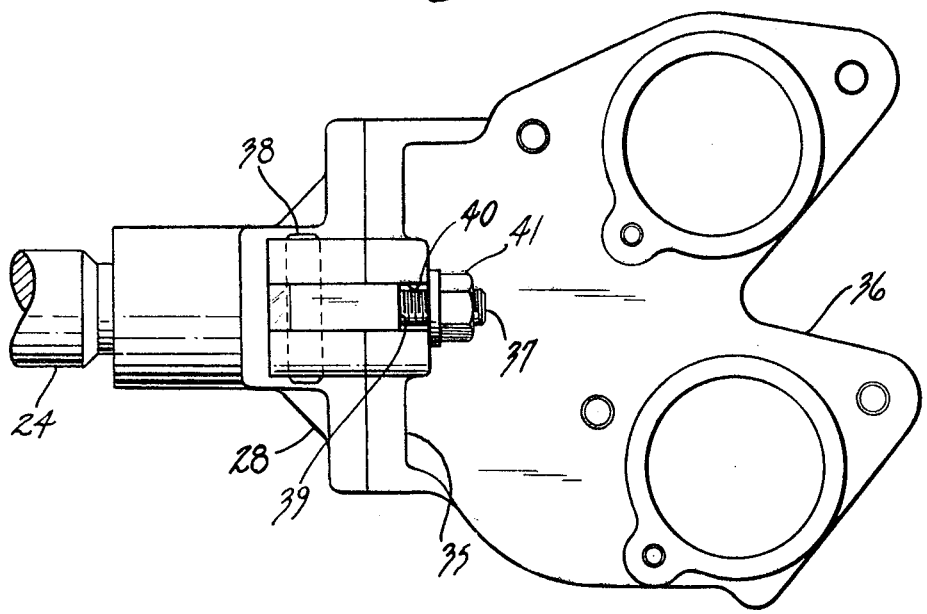
FIG. 2 is a plan view of the scoop holder shown in FIG. 1, drawn to a somewhat larger scale.

Turning now to the drawings in greater detail, FIG. 1 shows a molten glass feeder bowl 10 provided at the downstream end of a glass furnace forehearth 12, and having a conventional glass gob shearing mechanism 14 provided therebeneath for successively severing globs of glass forced through an opening in the lower portion of the feeder bowl by a suitable mechanism (not shown). The glass gobs 16 so formed travel downwardly after being severed by the shears 14 through one of a plurality of scoops 26, and thence downwardly through an associated fixed chute 18 into an associated blank mold 20 associated with one section of a Hartford I.S. glassware forming machine. A plurality of such sections would normally be provided and a corresponding number of fixed chutes 18a, 18b is provided for association with each of the machine sections. The operation of each of glassware forming machine sections is timed with respect to one another so that a single glass feeder bowl 10 can accommodate a plurality of such sections, and each such section has a scoop mechanism including a scoop 26 associated therewith for directing the gobs of glass into an appropriate chute 18, 18a, 18b. One such scoop mechanism is shown in FIG. 1 as comprising a fluid motor 22 having a fixed part mounted in the frame of the machine and a movable part in the form of a piston rod 24 which is movable from and to the active position shown in timed relationship with operation of an associated section of the glassware forming machine. Each section of the machine has its own associated chute such as that shown at 18, and also has its own associated scoop mechanism including a fluid motor such as that shown at 22. Each of the scoop mechanisms would preferably be identically constructed and arranged in a circular pattern as viewed from above and as described in Pat. No. 1,911,119 issued to Ingle May 23, 1933. Each scoop mechanism includes a scoop, such as that indicated at 26 in FIG. 1 and in the embodiment shown the scoop 26 is of the so-called double gob type, that is each scoop includes two side-by-side passageways as shown in FIG. 2 for accommodating two gobs of glass fed thereto from the feeder bowl 10. Thus, the number of such passageways will be seen to be dictated by the requirements of the particular machine sections and within the scope of the present invention each scoop may include one, two or three passageways according to the single, double or triple gob configuration of the glassware forming machine sections.

The piston rod 24 carries a flanged fitting 28, which fitting is permanently secured to the piston rod 24 by a lock screw 30. A guide pin 32 best shown in FIG. 3, is provided in the fitting 28 for preventing rotation of the fitting with respect to the piston rod 24. The fitting 28 includes a radially outwardly extending flanged portion adjacent the outer end of the piston rod, and the right-hand face of said flanged portion defines a pilot hub 34 which comprises a convenient orientation means for axially aligning a complementary cavity defined for this purpose on the inner flanged end of the scoop holder 36. In accordance with the present invention means is provided for releasably securing the scoop holder 36 to the flanged fitting 28, and as shown in FIG. 3, said means comprises a swing bolt 37 one end of which is hingedly connected to the fitting 28 on a pivot pin 38. The swing bolt 37 is movable into and out of a slot 40 provided for this purpose in a cooperatively shaped flange on the inner end of the scoop holder 36. With further reference to the swing bolt 37, a nut 41 is threadably received on its opposite end so as to releasably clamp the flanged inner end portion of the scoop holder 36 to the fitting 28 as shown in FIGS. 3 and 4. The diametrically opposed portion of the flanged fitting 28 threadably receives a stud or screw 42 having a stop pin 44 at one end and a head 46 at its opposite end to permit the screw 42 to be moved from the solid line position shown to the broken line position shown in FIG. 3. When in the broken line, or inactive position, the stud 42 permits the scoop holder 36 to be moved vertically upwardly as a result of the slot 48 provided for this purpose in the flanged inner end portion of the scoop holder. Thus, the inner end of the scoop holder 36 can be located on the pilot hub 34 provided for this purpose on the flanged fitting 28 and the stud 42 can be simultaneously placed in the slot 48 during assembly with the swing bolt in the broken line or inactive position. The swing bolt can then be lowered to the active position shown in full lines. The swing bolt 37 has a rectangularly shaped shoulder portion 39 which is of the same width as the slot 40 to locate the scoop holder 36 angularly with respect to the fitting 28 as said bolt is so positioned. The nut 41 can then be used to clamp the swing bolt in this position, and the stud or screw 42 moved to its active position to secure the scoop holder 36 to the fitting 28.

From the foregoing description it will be apparent that the scoop holder 36 is releasably clamped to the end of the piston rod 24 in a manner which permits ready removal and replacement of the scoop holder 36 and consequently of its associated scoop 26 whenever the latter becomes worn. Thus, it is an important feature of the present invention that an individual scoop holder can be removed for replacement or repair shutting down only the associated section of the glassware forming machine. Thus, the entire machine with all its associated sections need not be shut down nor need the operation of the gob forming mechanism be interrupted when a glassware forming machine is equipped with a quick change scoop holder constructed in accordance with the present invention.

I claim:

1. In a glassware forming machine having a plurality of individual mold sections with fixed chute means associated with each section, and said machine having glass gob forming means for successively forming glass gobs for all of said sections, the improvement comprising a horizontally reciprocable scoop mechanism for each section and including scoops to guide the gobs toward their associated chutes, each scoop mechanism including a fluid motor having a fixed part and a horizontally reciprocable part, a fitting permanently mounted to said reciprocable motor part and having a vertically extending flange, a stud threadably mounted in the lower portion of said flange fitting, a threaded bolt pivotally mounted on the upper portion of said flanged fitting, a scoop holder for each scoop mechanism to support the scoops in depending relationship, a vertically extending flange on one end of said scoop holder, an upwardly open slot in the upper portion of said flanged end to receive said pivotally mounted bolt, a nut threadably received on said pivotally mounted bolt for clamping the upper portion of said flange on said scoop holder, and a downwardly open slot in the lower portion of said flanged end of said scoop holder to receive said stud, and a head on said threaded stud for clamping the lower portion of said flange on said scoop holder.

2. The combination set forth in claim 1 wherein said flanged fitting includes a locating surface thereon for receiving a complementary surface on said scoop holder to align the latter with said fitting and thereby facilitate the assembly of said scoop holder with said fitting.

References Cited

UNITED STATES PATENTS

| 1,579,518 | 4/1926 | Connelly | 24—248 |
| 2,669,805 | 2/1954 | Rowe | 65—225 |
| 2,955,383 | 10/1960 | Lauck | 65—225 |

S. LEON BASHORE, Primary Examiner

J. B. HARDAWAY, Assistant Examiner

U.S. Cl. X.R.

65—207, 225, 304